A. GENDREAU.
DISAPPEARING CAR AND LOGGING SLED STAKE.
APPLICATION FILED MAR. 16, 1914.

1,142,879.

Patented June 15, 1915.
3 SHEETS—SHEET 1.

Section c-d. Fig. 2.

WITNESSES.
Arthur D. Bailey
Cosanna Toupin

INVENTOR.
Auguste Gendreau

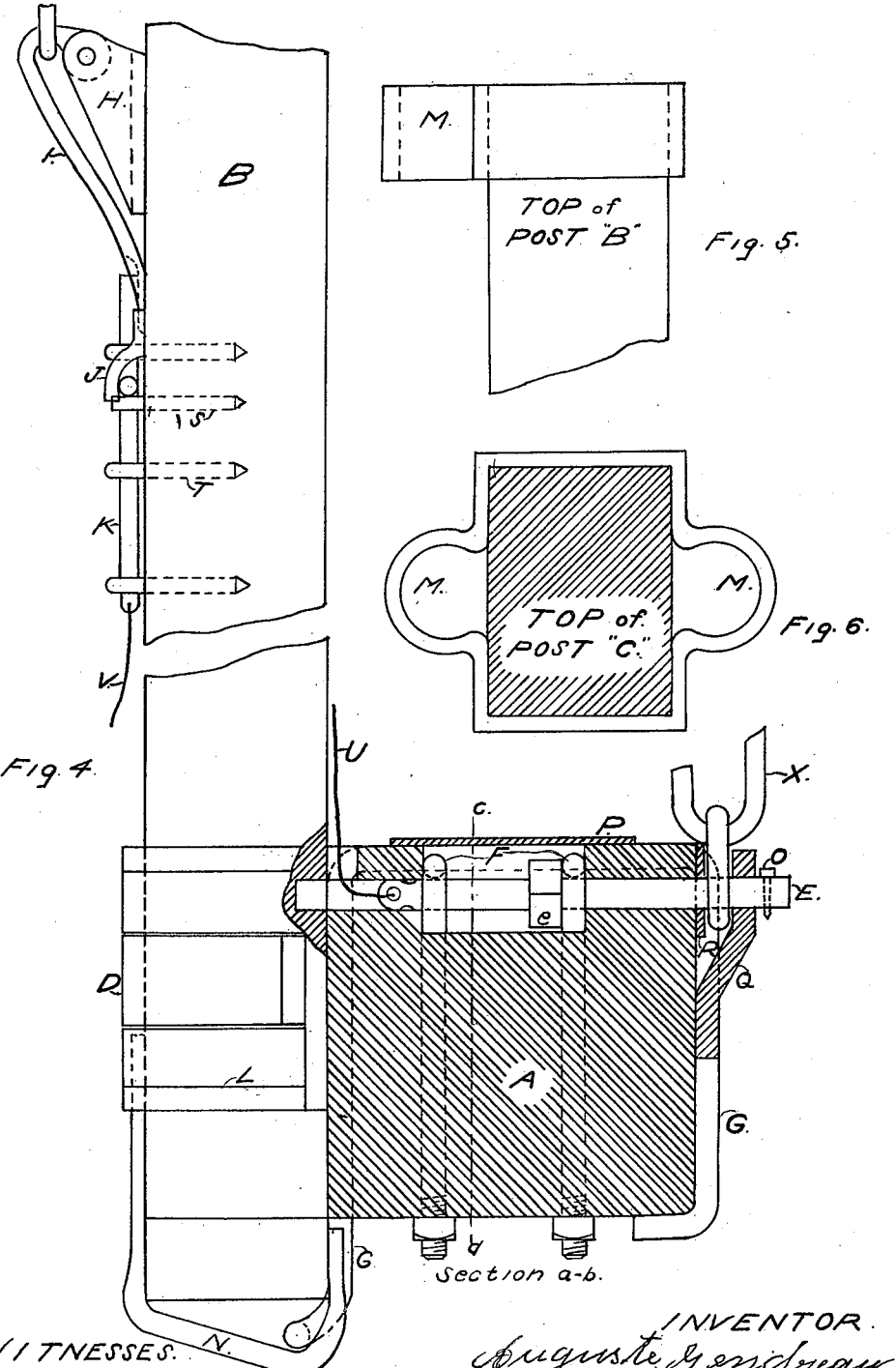

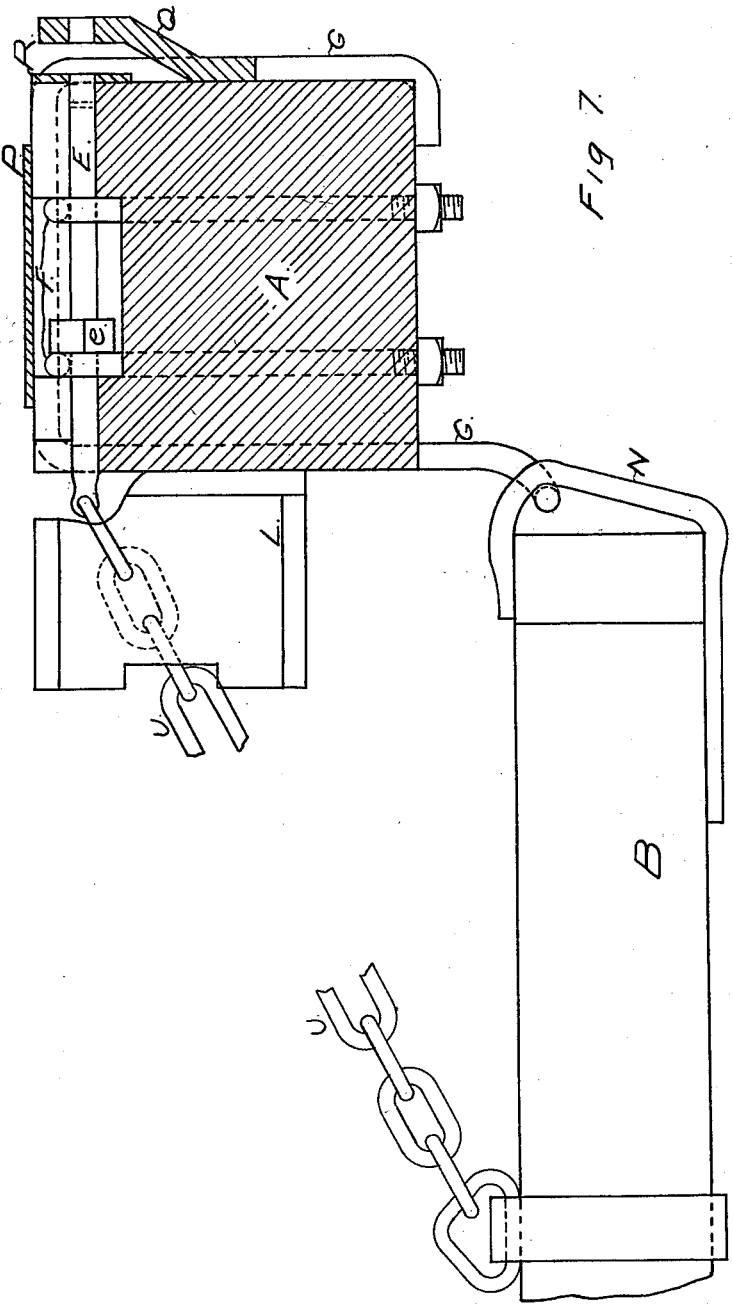

UNITED STATES PATENT OFFICE.

AUGUSTE GENDREAU, OF BEMIDJI, MINNESOTA, ASSIGNOR OF ONE-HALF TO ELMER E. McDONALD, OF BEMIDJI, MINNESOTA.

DISAPPEARING CAR AND LOGGING-SLED STAKE.

1,142,879.  Specification of Letters Patent.  Patented June 15, 1915.

Application filed March 16, 1914. Serial No. 825,144.

*To all whom it may concern:*

Be it known that I, AUGUSTE GENDREAU, a subject of Great Britain, residing at the city of Bemidji, county of Beltrami, and State of Minnesota, in the United States of America, have invented a new and useful Car and Logging-Sled Stake, which I designate as and give the title of Disappearing Car and Logging-Sled Stake.

The object and nature of the invention is to provide a logging car or sled stake to be used in hauling logs or timber that will be at all times attached to the sled or car bunk by means of a joint or knuckle, and when not in use and down, supported in a horizontal position by means of the knuckle and a chain leading from the sled or car bunk to the upper side of the stake and prevent from swinging by means of the joint or knuckle at the end and a side chain fastened one end on the side of the bunk, the other end on the side of the stake near the middle. When erect and ready for use, the stake will be supported by the knuckle or joint and prevented from moving inward by an angle iron or angle plate and a clasp attached to the side of the bunk extending around the stake and secured over a staple at the outer end of the bunk. And in this position, the stake would receive and hold the logs or timber as they are loaded. After the load is nearly completed and before loading the last tier of logs or timber on the load the upper ends of the stake are bound together by means of a wrapper chain, one end of which is attached to the opposite stake, the other end attached to a trip rod which is connected with the stake near the bottom by means of a small chain. After the remainder or top tier of logs or timber is in position, a second wrapper is applied, one end attached to the top of the opposite stake, as is the first wrapper chain. The chain passes over the top of entire load and through a strap of iron on the top of the stake where an oblong link on the end chain is held by a trip hook. The load being complete. This trip hook is controlled by a lock bolt to which is attached a trip chain of several feet in length passing out and to be used by the hand of the operator. By unlocking the trip bolt, which is done by revolving the same, the load is ready to be tripped. This is done by pulling upon the chain held in the hand of the operator causing the lock pin to pass downward relieving the trip hook containing the ring of the last binding or wrapper chain releasing the upper end of the stake from being bound to the opposite stake with the result that the stake will fall away from the load slightly and sufficiently to enable the top of the stake to be pulled or to fall forward or backward, as the case may be, until it reaches a position in the downward motion of the top where it is entirely out of the way of the logs, when the trip pin holding the ring of the first wrapper or binding chain is pulled endwise by reason of the strain of the chain attached to the end of the trip pin with the falling stake. When the falling stake moves the pin endwise sufficiently to cause it to pass out of the ring, the second binding chain is liberated leaving the load of logs entirely free to roll from the load without touching or endangering the stake, the stake remaining in horizontal position until placed in an erect position as before described.

I obtained these objects by the mechanism illustrated in the accompanying drawings consisting of seven figures, in which:

Figure 1 is a front view of the entire stake and end of car bunk or bolster of logging sled stake in position holding load of logs in place. Fig. 2 is a cross section lengthwise of bunk A, along line $c$ to $d$, shown in part A of Fig. 4 showing cross section of sliding or trip bolt with manner of securing the same to the bolster. Fig. 3 is an angle iron or brace in place upon bunk A in Fig. 1 and designated as L. Fig. 4 is side view of broken stake, cross-section of bunk, showing sliding rod E and mechanism of releasing binding chain X and showing trip hook I and mechanism of knuckle holding lower portion of stake and binding clamp D, which secures post in upright position. Fig. 5 is top of post B either front or rear post with strong iron band M at the top with loop placed in front or rear side through which chain Y in Fig. 1 passes and by which it is held. Fig. 6 is top of opposite post hereinbefore referred to. Fig. 7 is side view of the lower end of the rear stake when down in position for unloading logs from the car bunks or logging sled bunks with a cross section view of the bunk A along the line $a$ to $b$ Fig. 1.

Similar letters refer to same parts throughout the several figures or views.

*Detailed description.*

Cars used for hauling saw-logs or other round large timber are what is known as flat cars and equipped at either end with a pair of bunks or bolsters resting on top of the floor of the car and about eight feet apart and extending crosswise and either end extending over the edge of the floor of the car so that the edge of the load is flush with and perpendicular to the floor of the car. The stakes and their fastenings are attached to that portion of the bunk extending beyond the load. The bunks or bolsters, sometimes so called, are of timber of various dimensions from eight inches by eight inches to ten inches by twelve inches in size and ten feet long. The stakes are of wood varying in height from six to nine feet and varying in size from six inches by six inches to eight inches by eight inches. The bunk or bolster and stake of a logging sled is of similar size varying with the size of the sled and the load to be hauled. The bunk or bolster and stake of a vehicle carrying load of logs or timber would be of similar size and position. At the bottom of the stake extending down the front for a short distance and along the bottom at a little distance therefrom and up the back of the stake a short distance is a heavy iron loop, being N in Figs. 1, 4 and 7.

Figure 1:
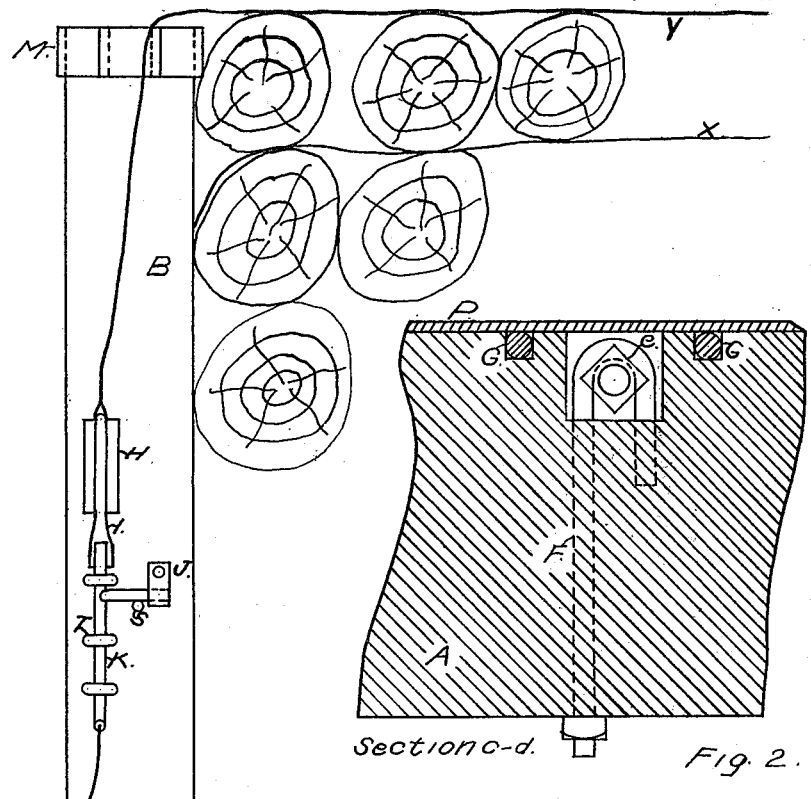

Passing through this iron loop N, making a loose joint or knuckle, is another heavy iron loop, either end extending from the loop up along and fastened to the same side of the bolster as the stake is on, one arm extending over the top of the bolster down over the back or opposite side of the bolster returning on the under edge, and being G in Figs. 1, 4 and 7.

Figure 3:
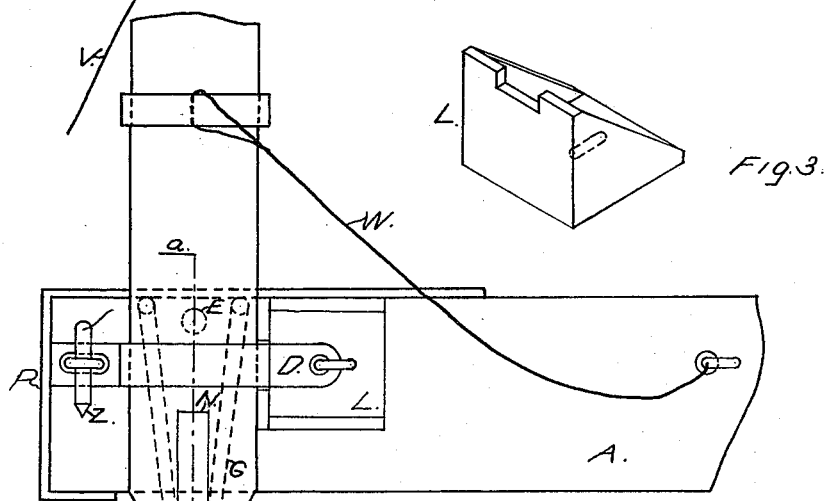

On the side of bolster A and adjoining the inside of the position of the stake and facing the side of the stake is the angle iron or brace L, shown in place in Fig. 1 and Fig. 7 and illustrated in Fig. 3. This angle iron is securely fastened to the side of bunk or bolster A. On the same side of the bunk or bolster is a heavy iron clamp secured to the bolster at the inside end with heavy staple or returning bolt and extending with two angles around the stake and returning to the face of the bunk or bolster on the outside of the stake and held in place with a staple or returning bolt with key outside the clamp, and is shown in Figs. 1 and 4 as D. The pin holding the same in place is designated as Z on Fig. 1.

A chain is attached to the front of bolster A and extends to the front of stake B and is designated W in Fig. 1. It is attached to a band around the stake B and hangs loose and out of the way when post is erected.

On the surface of the end of the bunk is placed a heavy sheet of iron extending to the outer end down over the end and returning under the end of the bunk, and is designated as P upon Figs. 1, 2, 4 and 7.

Passing crosswise through the upper portion of the bunk A is an opening in which is placed a trip bolt E, shown in Figs. 1, 4 and 7, upon which is a block-head or bur securely fastened to the bolt and indicated as e on the bolt E.

On the back of the bunk or side opposite the location of the stake is an angle iron securely fastened to the side of the bunk extending upward and opposite the opening in which the trip bolt E is and having opposite the opening a hole of proper size to admit the entering of the trip bolt E. This angle iron is shown in Figs. 4 and 7 as Q. The trip bolt is held in place when load is being retained by key O, shown in Fig. 4. On the side of the bunk and in front of this angle iron Q is a plate R with hole opposite the opening in which E rests permitting trip bolt E to pass through same. Holding this trip bolt in place are two returning bolts passing from the top of the bunk under the iron plate P, down through the bunk A with burs on the bottom and designated F in Figs. 4 and 7.

Attached to the trip bolt is a chain extending from the eye of the trip bolt out at the edge of the bunk and attached to the side of the stake B in the same band as is attached the chain W, as appears in Fig. 1.

Affixed to the front side of the front stake, which would be the back side of the rear stake, is a trip hook I, as shown in Figs. 1 and 4, which moves upon a hinge in bracket H, as shown in Figs. 1 and 4. This hook is held when load is being carried, by a slip rod K, which is fastened to post B by staple T, as shown in Figs. 1 and 4. A slip rod is held in place by short arm supported on pin S and locked by swinging catch J, as appears in Figs. 1 and 4.

To the lower end of this slip bolt is attached the chain V as shown in Figs. 1 and 4.

Extending from the upper portion or loop of the trip hook I is a binding chain passing up along side the front or rear, as the case might be, of the stake B through the loop in the band M at the top of post B and across over the top of the load to the top of the opposite post C in Fig. 6 and attached to the front loop in the iron band M of that post.

Attached to the opposite loop of iron band M on top of post C, Fig. 6, is another binding or wrapper chain extending from the top of the post C across the load and under several logs resting in the middle of the load down over the side of the load, where the stakes involved are to trip bolt E where the trip bolt E passes through the ring and the ring is held in place by the trip bolt E and between the angle brace Q and the plate R. This second binding chain is shown in Figs. 1 and 4 as X.

In operation, two stakes support one side of the load of logs. Before commencing to load, each stake will be down or in a position represented in Fig. 7. The lower end is held solidly but slightly loose in the joint form by the loops N and G and supported by the chain U and held parallel with the side of the car or the sled by the chain W. The stake then is readily put in an upright position by lifting the outer end until the stake B is upright and the inside face of the lower end is against the side or face of the bunk or bolster A and the inside face of the stake flat against the face of the angle iron L. Then the clamp D is placed around the post and clamp secured against the face of the bunk or bolster A and the outer three sides of the stake B by pin Z in place in staple in the bunk or bolster. The binding or wrapping chains remain suspended from either loop in the band M on the top of the post C, Fig. 6. The stake involved is then held firmly in position by the loose joint made by the iron loops N and G and by the angle iron L and the angle clasp or strap D and ready to receive the load. After the car or the logging sled is loaded with the exception of a few logs to be placed in the middle of the load as binders, the wrapping chain X is carried across from the top of the post C along the top of the load and down the side of the load behind the stake B and the ring in the end thereof placed between the angle iron Q and the plate R when the trip rod E is moved endwise passing through the ring and through the angle iron Q and fastened securely in place by insertion of the pin O. Then the load is ready for a few logs as binders to be placed in the center of the load resting upon the chain X causing it to be held taut. Then the other wrapping chain attached to the opposite loop in the band M on the top of post C is carried across over the top of the entire load to the top of the post B and through the loop M in Fig. 5 and downward along the front or back, as the case might be, of the stake B and the flattened ring placed over the trip hook I. The trip hook is then drawn down so that its lower end rests against the side of the stake B. The trip rod K is then raised in position so that the upper end overlaps the lower end of the trip hook I and the trip rod K is then revolved so that the arm is brought against the face of the stake B and held in position by resting on the pin S and under the lock J. The load is then complete and the load is held in place by the stakes B and C and another similar set at other end of vehicle and two sets of binding chains X and Y.

*To unload.*—Two stakes support one side of the load of logs. An operator is placed at each stake and act in unison. The iron clasp D is relieved by removal of the pin Z allowing the clasp to drop down and remain suspended from the staple on the face and along the face of the angle iron L and the side of the bunk A. The pin O in the trip rod E is removed to permit the trip rod E to move endwise. The lock J is turned to relieve the arm of the trip bolt K. The arm is swung out so as to be free of the pin S. The operators then in unison pull downward on the chain V, which is of sufficient length to permit them to be at a point of safety. The slip rod K will be pulled downward relieving the lower end of the trip hook I permitting it to fly upward and allow the link in the chain Y to be disengaged. The stake will move slightly away from the side of the load being restrained from going too far by the chain W and the lower end working upon the loop hinge made by the loop irons N and G. The stake will fall or be taken to the front or the rear, as the case may be, leaving the first wrapping or binding chain X holding the load securely in place until the stake B has reached a position near its final position when the chain U will be tightened and the further downward motion of the stake will pull the slip or trip bolt E endwise relieving the ring in the chain Y when the logs will be free to roll from their position on the load to the landing and without any danger to the operators or touching the stake. The logs remaining upon the bunks that do not roll off can be easily rolled off by hand without touching or interfering with the stakes.

When the load of logs is removed, the car or the logging sled can be moved without erecting the stakes.

Having thus described the invention and manner of operating, the following is claimed as new and is desired to be secured by Letters Patent, namely:

1. A stake for vehicles carrying logs or timber, permanently attached at the lower end to the bunk of the vehicle by means of a knuckle, one part of which is attached to the bunk, the other to the stake with means for holding the stake in upright position while being loaded or while carrying the load with means for releasing the stake from its upright position permitting it to fall forward or backward out of the way of the load while being removed.

2. A stake for vehicles carrying logs or timber, permanently attached at the lower end to the bunk of the vehicle by means of a knuckle joint, one part of which is attached to the bunk, the other to the stake with a clamp affixed to the bunk to aid in holding the stake in an upright position with means for holding the stake in an upright position while being loaded or while carrying the load with means for releasing the stake from its upright position permitting it to fall forward or backward out of the way of the load while being removed.

3. A stake for vehicles carrying logs or timber, permanently attached at the lower end to the bunk of the vehicle by means of a knuckle joint, one part of which is attached to the bunk, the other to the stake with a clamp affixed to the bunk to aid in holding the stake in an upright position with an angle iron attached to side of bunk with face of one angle at inside of stake with means for holding the stake in an upright position while being loaded or while carrying the load with means for releasing the stake from its upright position permitting it to fall forward or backward out of the way of the load while being removed.

4. A stake for vehicles carrying logs or timber, permanently attached at the lower end to the bunk of the vehicle by means of a knuckle joint, one part of which is attached to the bunk, the other to the stake with a clamp affixed to the bunk to aid in holding the stake in an upright position with an angle iron attached to side of bunk with face of one angle at inside of stake with a chain secured to the front or rear face of the bunk, as the case may be, at one end and adjustably secured to the stake, at its inner side, at the other end to hold the stake in the position of being horizontal or lateral to the load while the stake is down and holding the stake out of the way of the logs or timber while being removed from the load, with means for holding the stake in an upright position while being loaded or while carrying the load with means for releasing the stake from its upright position permitting it to fall forward out of the way of the load while being removed.

5. A stake for vehicles carrying logs or timber, permanently attached at the lower end to the bunk of the vehicle by means of a knuckle joint, one part of which is attached to the bunk, the other to the stake with a clamp affixed to the bunk to aid in holding the stake in an upright position with an angle iron attached to side of bunk with face of one angle at inside of stake with a chain secured to the front or rear face of the bunk, as the case may be, at one end and adjustably secured to the stake, at its inner side, at the other end to hold the stake in the position of being horizontal or lateral to the load while the stake is down and holding the stake out of the way of the logs or timber while being removed from the load, with a binder chain, one end attached to a band around the top end of the opposite stake passing over the top of the entire load through a band or ring at the top of the stake in question, then down along the front or the rear of the stake, as the case may be, to a trip hook with a ring in the end of the chain passing over and held by the trip hook, which trip hook is operated or released by means of a sliding bolt with chain attached to lower end to be held in hand of the operator and used by exerting a pull upon the chain for releasing this binding chain permitting the stake to fall forward or backward or laterally to the load and pass into a position out of the way while the load is being discharged from the vehicle, the load being held in position and preventing from binding the stake by means of another binding chain, with means for holding the stake in an upright position while being loaded or while carrying the load with means for releasing the stake from its upright position permitting it to fall forward out of the way of the load while being removed.

6. A stake for vehicles carrying logs or timber, permanently attached at the lower end to the bunk of the vehicle by means of a knuckle joint, one part of which is attached to the bunk, the other to the stake with a clamp affixed to the bunk to aid in holding the stake in an upright position with an angle iron attached to side of bunk with face of one angle at inside of stake with a chain secured to the front or rear face of the bunk, as the case may be, at one end and adjustably secured to the stake, at its inner side, at the other end to hold the stake in the position of being horizontal or lateral to the load while the stake is down and holding the stake out of the way of the logs or timber while being removed from the load, with a binder chain, one end attached to a band around the top end of the opposite stake passing over the top of the entire load through a band or ring at the top of the stake in question, then down along the front or the rear of the stake, as the case may be, to a trip hook with a ring in the end of the chain passing over and held by the trip hook, which trip hook is operated or released by means of a sliding bolt with chain attached to lower end to be held in hand of the operator and used by exerting a pull upon the chain for releasing this binding chain permitting the stake to fall forward or backward or laterally to the load and pass into a position out of the way while the load is being discharged from the vehicle, the load being held in position and preventing from binding the stake by means of another binding chain, with a binder chain, one end of which chain is attached to a band around the top of the opposite stake passing over the top of the load and under a few logs or pieces of timber and down along side of the load to the rear of the front stake and to the front of the rear stake and fastened to the bunk or bolster by passing the ring in the end of the chain over a sliding trip bolt passing through the end of the bunk and held at the end by angle iron in the bunk with returning bolt, with means for holding the stake in an upright position while being loaded or while carrying the load with means for releasing the stake from its upright position permitting it to fall forward out of the way of the load while being removed.

7. A stake for vehicles carrying logs or timber, permanently attached at the lower end to the bunk of the vehicle by means of a knuckle joint, one part of which is attached to the bunk, the other to the stake with a clamp affixed to the bunk to aid in holding the stake in an upright position with an angle iron attached to side of bunk with face of one angle at inside of stake with a chain secured to the front or rear face of the bunk, as the case may be, at one end and adjustably secured to the stake, at its inner side, at the other end to hold the stake in the position of being horizontal or lateral to the load while the stake is down and holding the stake out of the way of the logs or timber while being removed from the load, with a binder chain, one end attached to a band around the top end of the opposite stake passing over the top of the entire load through a band or ring at the top of the stake in question, then down along the front or the rear of the stake, as the case may be, to a trip hook with a ring in the end of the chain passing over and held by the trip hook, which trip hook is operated or released by means of a sliding bolt with chain attached to lower end to be held in hand of the operator and used by exerting a pull upon the chain for releasing this binding chain permitting the stake to fall forward or backward or laterally to the load and pass into a position out of the way while the load is being discharged from the vehicle, the load being held in position and preventing from binding the stake by means of another binding chain hereinafter referred to, with a binder chain, one end of which chain is attached to a band around the top of the opposite stake passing over the top of the load and under a few logs or pieces of timber and down along side of the load to the rear of the front stake and to the front of the rear stake and fastened to the bunk or bolster by passing the ring in the end of the chain over a sliding trip bolt passing through the end of the bunk and held at the end by angle iron in the bunk with the returning bolt, with draft chain connecting with the opposite end of this sliding trip bolt and secured to the rear or front side of the stake, as the case may be, with an eye, which chain, when the stake is approaching a position to the front or the rear, as the case may be, parallel and horizontal with the load, will pull the trip bolt endwise relieving the binding chain and releasing the load allowing the load to fall or be removed from the vehicle.

In testimony whereof I have signed my name to this specification in presence of two subscribing witnesses.

AUGUSTE GENDREAU.

Witnesses:
 CORANNA TOUPIN,
 GEORGE T. SIMPSON.

Copies of this patent may be obtained for five cents each, by addressing the "Commissioner of Patents, Washington, D. C."